(12) United States Patent
Ono

(10) Patent No.: US 7,354,173 B2
(45) Date of Patent: Apr. 8, 2008

(54) LIGHTING APPARATUS HAVING A UNIFORM LUMINANCE PROFILE

(75) Inventor: Shin-ichirou Ono, Kanagawa (JP)

(73) Assignee: NEC LCD Technologies, Ltd. (JP)

( * ) Notice: Subject to any disclaimer, the term of this patent is extended or adjusted under 35 U.S.C. 154(b) by 99 days.

(21) Appl. No.: 11/240,174

(22) Filed: Sep. 30, 2005

(65) Prior Publication Data

US 2006/0083025 A1  Apr. 20, 2006

(30) Foreign Application Priority Data

Oct. 15, 2004  (JP)  ............................. 2004-301084

(51) Int. Cl.
*F21V 7/04* (2006.01)
(52) U.S. Cl. ...................... 362/247; 362/235; 362/297; 362/346
(58) Field of Classification Search ................. 362/29, 362/235, 237, 240–242, 243, 30, 225, 247, 362/297, 398; 361/346
See application file for complete search history.

(56) References Cited

U.S. PATENT DOCUMENTS 6,464,367 B2 * 10/2002 Ito et al. ..................... 362/613
6,783,256 B2 * 8/2004 Moon ......................... 362/241
6,857,759 B2 * 2/2005 Lee et al. .................... 362/225
6,960,002 B2 * 11/2005 Tsai ............................ 362/225
6,974,221 B2 * 12/2005 Wu et al. ...................... 362/29
7,106,394 B2  9/2006 Ono et al. ..................... 349/62
2005/0073858 A1 * 4/2005 Kim et al. ................... 362/561
2005/0225960 A1 * 10/2005 Tsai ............................. 362/23

FOREIGN PATENT DOCUMENTS

| CN | 1534353 | 10/2004 |
|---|---|---|
| JP | 4-275525 | 10/1992 |
| JP | 11-126505 | 5/1999 |
| KR | 20020067232 | 8/2002 |
| KR | 20030093845 | 12/2003 |

* cited by examiner

*Primary Examiner*—Y Quach Lee
*Assistant Examiner*—Leah S. Lovell
(74) *Attorney, Agent, or Firm*—Hayes Soloway P.C.

(57) ABSTRACT

A direct-emission backlight unit for use in an LCD device includes a plurality of elongate lamps at the rear of a light diffusion plate and a plurality of reflecting members arranged in a matrix on a rear reflecting plate. The reflecting members are disposed in the gap between adjacent lamps, and reflect light emitted by the lamps toward the diffusion plate for achieving a uniform luminance profile of the emission surface of the backlight unit.

26 Claims, 21 Drawing Sheets

LIGHTING APPARATUS HAVING A UNIFORM LUMINANCE PROFILE

BACKGROUND OF THE INVENTION (a) Field of the Invention

The present invention relates to a lighting apparatus and a liquid crystal display (LCD) device, and more particularly, to the specific structure of a lighting apparatus and an LCD device including such a lighting apparatus as a backlight unit.

(b) Description of the Related Art

An LCD device known as a transmissive LCD device includes a backlight unit as a lighting apparatus for irradiating an LC panel of the LCD device from the rear side of the LC panel. The backlight unit is generally categorized into two types: direct-emission type and an edge-emission type. The direct-emission type includes a plurality of lamps at the rear of the emission surface of the backlight unit, whereas the edge-emission type includes a light conductive plate on the rear side of the emission surface of the backlight unit for guiding light emitted by a lamp. The direct-emission type achieves a higher luminance compared to the edge-emission type, and thus is especially suited to a large-screen LCD device.

FIG. 21 shows a direct-emission backlight unit for use in an LCD device in an exploded perspective view thereof. FIG. 22 shows a sectional view of the backlight unit of FIG. 21, taken along line XXII-XXII in FIG. 21. The backlight unit, generally designated by numeral 60, includes a rear reflection plate 11, and a lamp assembly 12 including a plurality of elongate lamps 13 extending parallel to one another in front of the rear reflection plate 11. The lamp assembly 12 includes an inverter 14 connected at one ends of the lamps 13, a return substrate 15 connected to the other ends of the lamps 13, and a return cable 16 having a first end connected to the return substrate 15 and a second end connected to the ground of the inverter 14. The inner surface of the rear reflection plate 11 has a reflectance of 95%, for example, and has a light scattering property.

A pair of support members 17 support both ends of the elongate lamps 13 while receiving the same at the cutout portions 17a of the support members 17. A diffusion plate 18 and an optical sheet assembly 19 are consecutively disposed to press the support members 17 toward the lamps 13. The optical sheet assembly 19 may include a diffusion sheet, a lens sheet and a luminescent film, for example. The optical sheet assembly 19 and the diffusion plate 18 are received in a backlight chassis 20 having a front opening, which exposes therethrough the emission surface 20a of the backlight unit 60. The backlight unit 60 emits light through the emission surface 20a toward the LC panel not shown.

The distance between the diffusion plate 18 and the centers of the lamps 13 is about 10 mm, for example, whereas the center-to-center distance between two adjacent lamps 13 is about 20 mm, for example. Some light beams emitted from one of the lamps 13 are directly incident onto the diffusion plate 18, whereas other some light beams emitted from the one of the lamps 13 are incident onto the diffusion plate 18 after being reflected by the rear reflection plate 11. The light beams incident onto the diffusion plate 18 is diffused thereby and emitted outside the backlight unit 60 through the emission surface 20a.

In an LCD device, the backlight unit is desired to have an emission surface having a higher luminance uniformity for achieving a superior image quality. However, the direct-emission backlight unit generally has an ununiform luminance profile on the emission surface thereof, as shown in FIG. 23, due to the arrangement of the lamps 13. The ununiform luminance profile is such that portions of the emission surface corresponding to the centers of the lamps have a higher luminance whereas the other portions of the emission surface corresponding to the gap between the lamps has a lower luminance. In a recent tendency, since the backlight unit has a smaller thickness due to the smaller thickness of the LCD device, the problem of the ununiform luminance profile on the emission surface is emphasized by a reduced distance between the emission surface and the lamps.

For suppressing the ununiform luminance on the emission surface of the backlight unit, a dot-pattern printing technique, for example, may be employed on the rear surface of the diffusion plate. The dot-pattern printing technique may be used so that the density of dots is highest at the fronts of the centers of the lamps, reduced along the lateral direction from the centers, and lowest at the fronts of the gap centers between the lamps. The dot pattern scatters the light emitted from the lamps to moderately reduce the luminance at the gaps between the lamps. The dot-pattern printing technique, however, involves a problem of a chromaticity difference on the emission surface due to the reflection characteristic of the ink material used for the printing.

Patent Publications JP-A-4(1992)-275525 and -11(1999)-126505, for example, describe techniques for suppressing the ununiformity of the luminance without using the dot-pattern printing technique. JP-A-4-275525 uses a rear reflection plate having a convex portion at the rear of the gap between the lamps, the convex portion having a higher reflectance to thereby increase the luminance at the front of the gap between the lamps. JP-A-11-126505 uses another rear reflection plate having convex portions and concave portions alternately arranged at a pitch corresponding to the pitch of the lamps, the concave portions being disposed corresponding to the centers of the lamps. The backlight units described in these publications may increase the luminance at the front of the gaps between the lamps, to thereby suppress the ununiformity of the luminance on the emission surface.

In the techniques described in the publications, there is a problem however that the optimum profile of the rear reflection plate differs depending on the distance between the diffusion plate and the lamps, pitch of the lamps, diameters of the lamps etc., which fact consumes a longer time in the design and production of the prototype backlight units for assuring the effectiveness of the design, although the design itself may be performed using a simulation.

SUMMARY OF THE INVENTION

In view of the above problem in the conventional techniques, it is an object of the present invention to provide a lighting apparatus, which is capable of suppressing the ununiformity of the luminance without involving a chromaticity difference on the emission surface thereof.

It is also an object of the present invention to provide an LCD device including such a lighting apparatus as a backlight unit.

The present invention provides a lighting apparatus including a light diffusion plate, a plurality of luminescent members extending parallel to one another in an operative relationship with the light diffusion plate, and a reflecting member having at least one reflecting surface, at least a portion of the reflecting surface being disposed between adjacent luminescent members and extending in a direction crossing an extending direction of the luminescent members.

In accordance with the present invention, the reflecting member reflects light emitted by the luminescent members toward the light diffusion plate to increase the luminance of a portion of the emission surface of the lighting apparatus in front of the gap between the luminescent members, thereby improving the luminance profile of the emission surface.

The above and other objects, features and advantages of the present invention will be more apparent from the following description, referring to the accompanying drawings.

BRIEF DESCRIPTION OF THE DRAWINGS

FIGS. 9B and 9C are side views as viewed along arrows B and C, respectively, in FIG. 10A.

PREFERRED EMBODIMENT OF THE INVENTION

Figure 1:
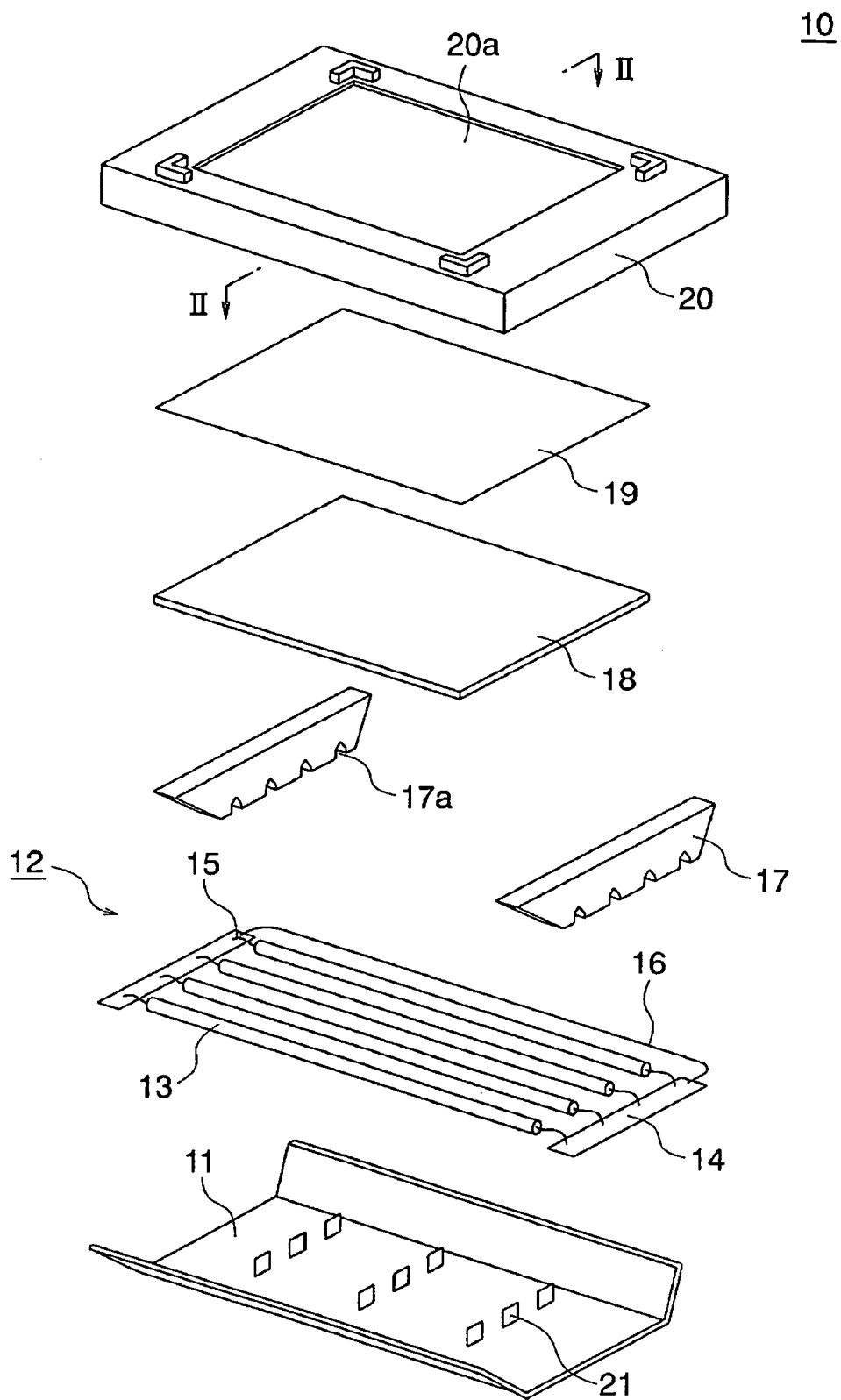
FIG. 1 is an exploded perspective view of a lighting apparatus according to a first embodiment of the present invention.

Now, the present invention is more specifically described with reference to accompanying drawings, wherein similar constituent elements are designated by similar reference numerals throughout the drawings.

Figure 2:
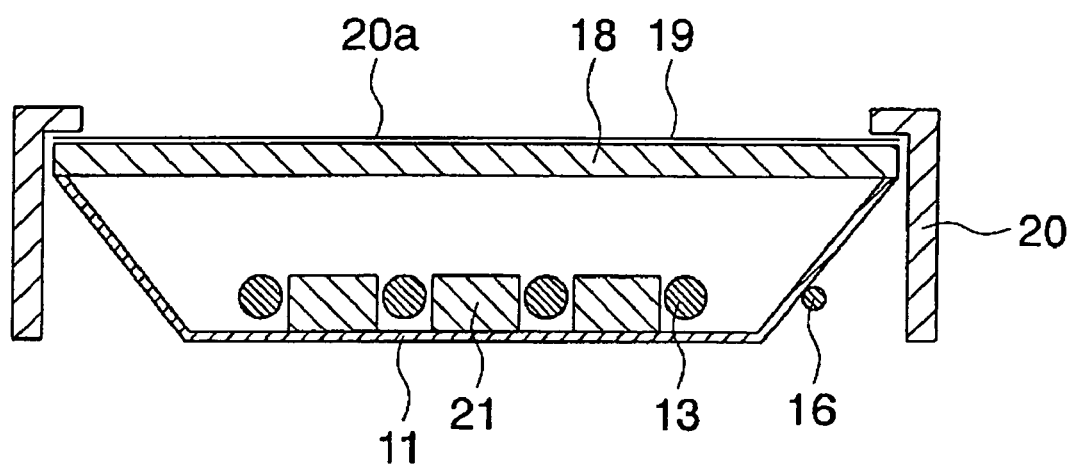
FIG. 2 is a sectional view of the lighting apparatus taken along line II-II in FIG. 1.
Figure 3A:
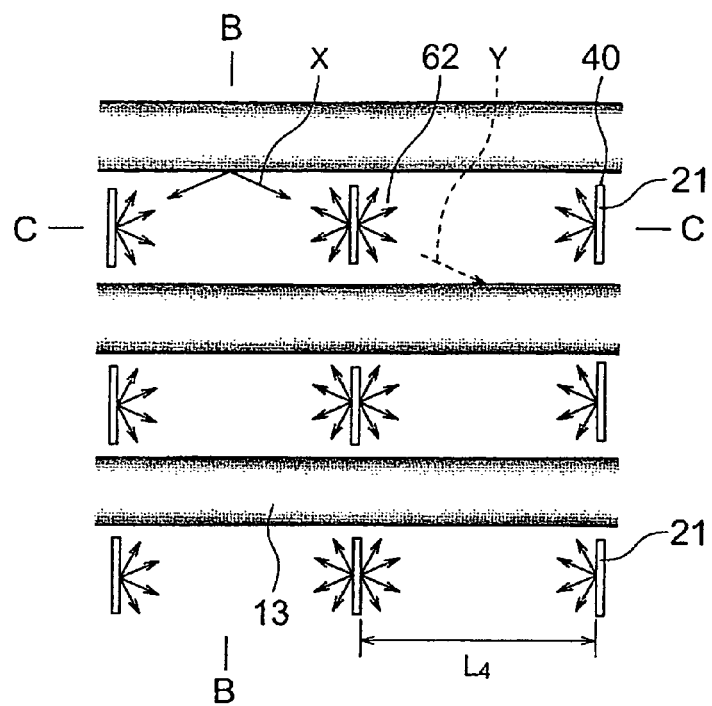
FIG. 3A is a top plan view of the lighting apparatus of FIG. 1, and FIGS. 3B and 3C are sectional views taken along line B-B and line C-C, respectively, in FIG. 3A.
Figure 3B:
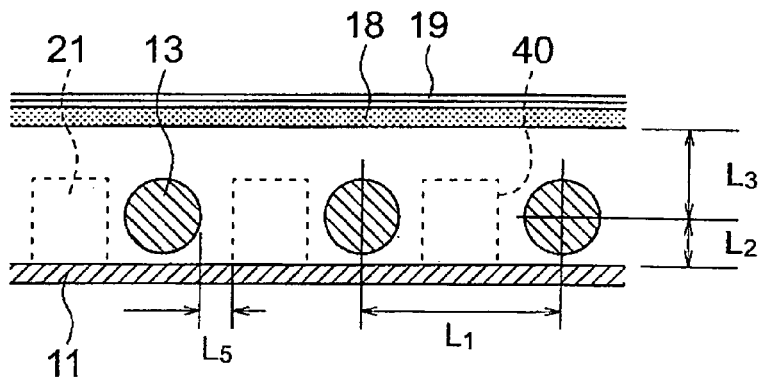
Figure 3C:
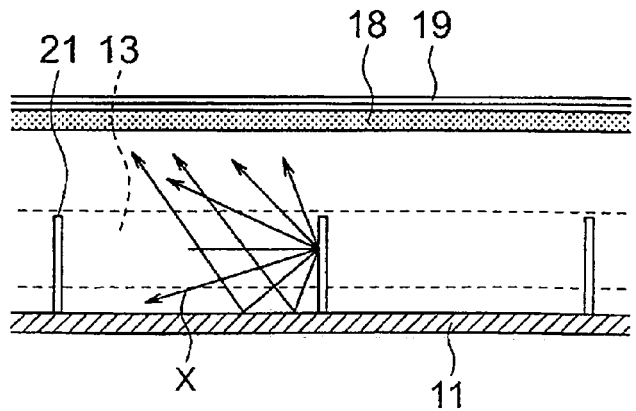
Figure 21:
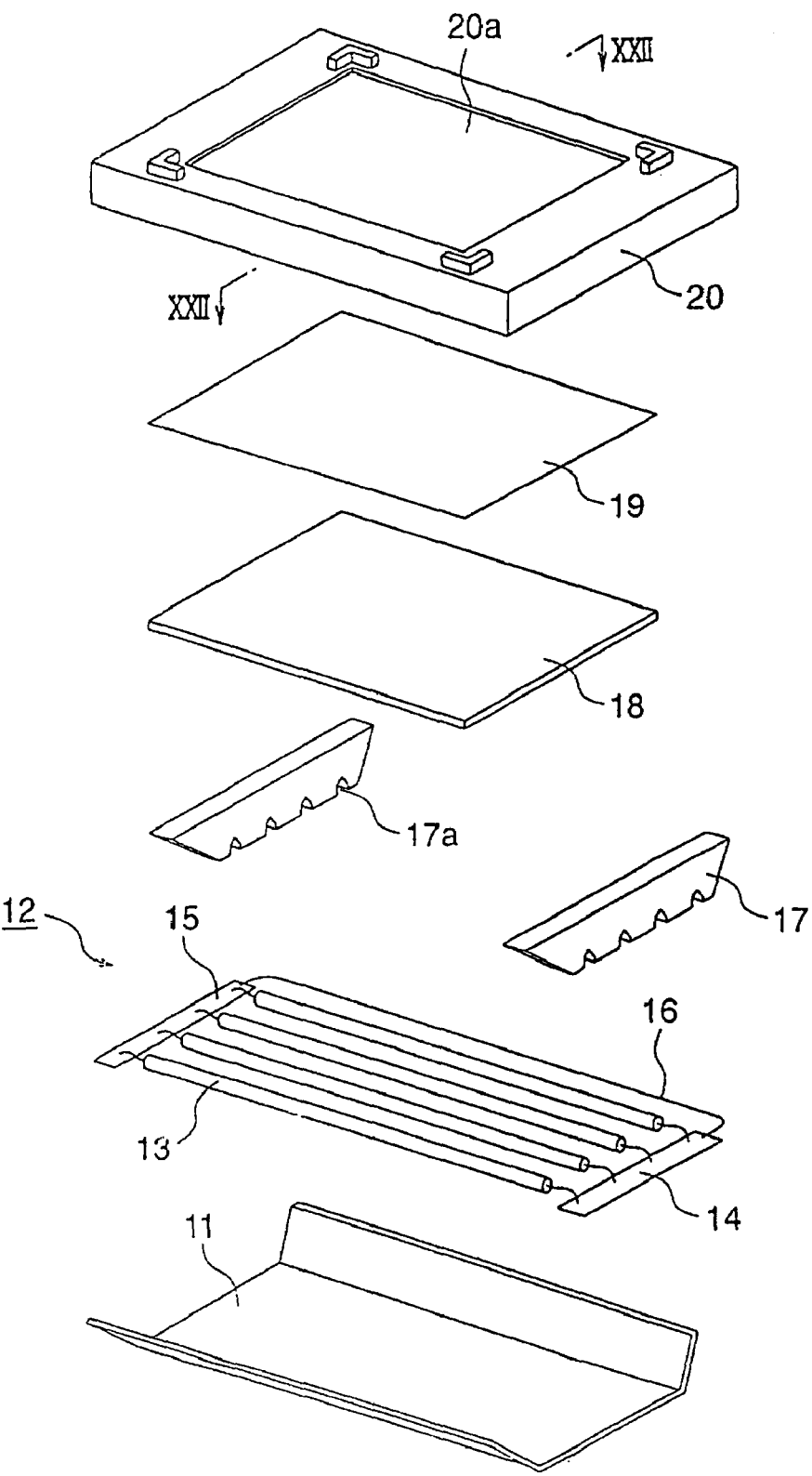
FIG. 21 is an exploded perspective view of a conventional lighting apparatus.
Figure 22:
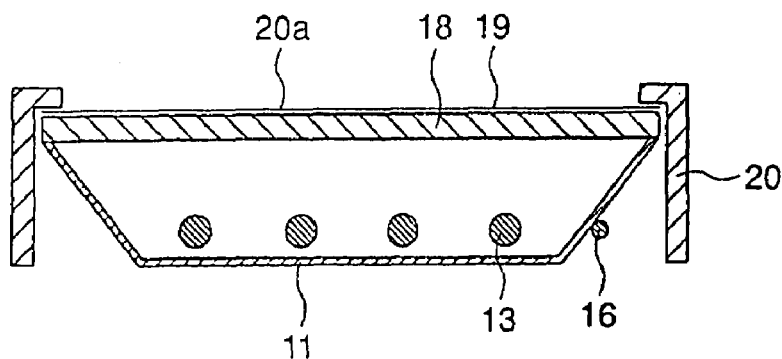
FIG. 22 is a sectional view of the conventional lighting apparatus of FIG. 22 taken along line XXII-XXII in FIG. 21.
Figure 23:
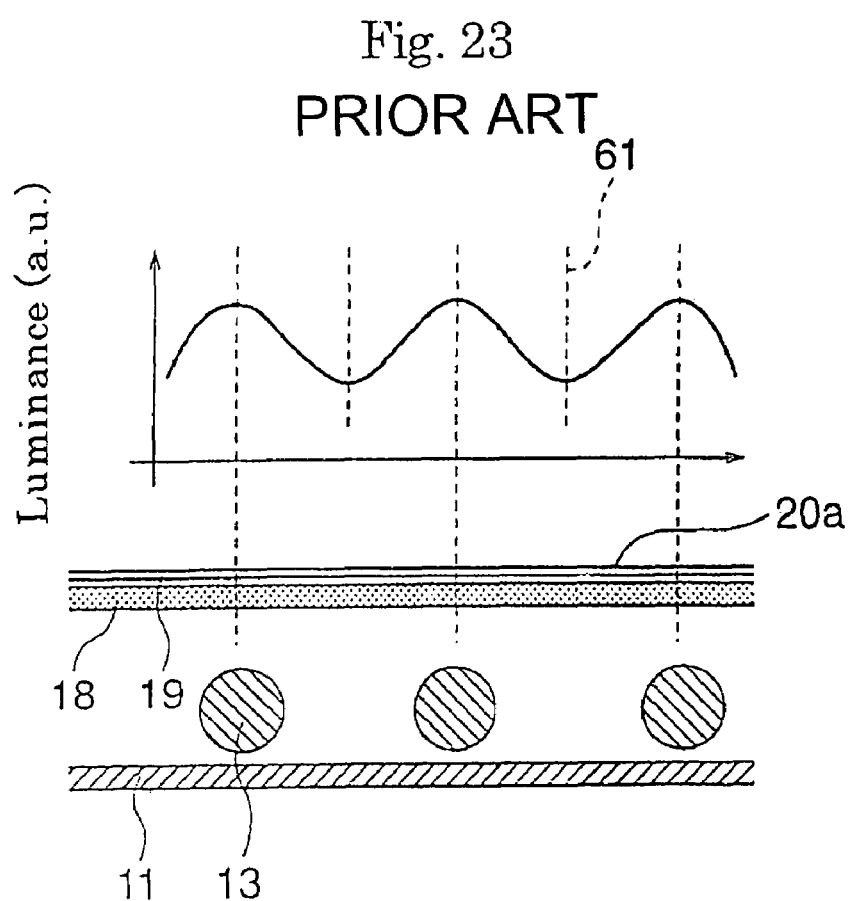
FIG. 23 is a graph depicting a luminance profile on the emission surface of the conventional lighting apparatus.

FIG. 1 shows a lighting apparatus according to a first embodiment of the present invention in an exploded perspective view thereof. FIG. 2 shows the lighting apparatus of FIG. 1 in a sectional view taken along line II-II in FIG. 1. The lighting apparatus 10 of the first embodiment is similar to the conventional direct-emission backlight unit 60 shown in FIGS. 21 and 22 except that the rear reflection plate 11 shown in FIG. 1 mounts thereon a plurality of reflecting members 21 arrayed on the inner surface of the rear reflection plate 11. That is, a plurality of reflecting members 21 are arranged in a matrix on the rear reflection plate 11, each reflection member 21 being disposed in the gap between adjacent lamps 13. Thus, description of the other components in the lighting apparatus of FIG. 1 will be omitted here for avoiding the duplication. FIG. 3A shows a portion of the lighting apparatus 10 of FIG. 1, and FIG. 3B and 3C show the lighting apparatus 10 in a sectional view taken along lines B-B and C-C in FIG. 3A.

The lighting apparatus 10 includes a plurality of reflecting members 21 fixed onto the rear reflection plate 11. The reflecting members 21 are aligned in the directions parallel to and normal to the extending direction of the lamps or luminescent members 13. Each reflecting member 21 has a pair of reflecting surfaces or mirror surfaces directed to opposite directions and extending normal to the extending direction of the lamps 13.

Figure 4:
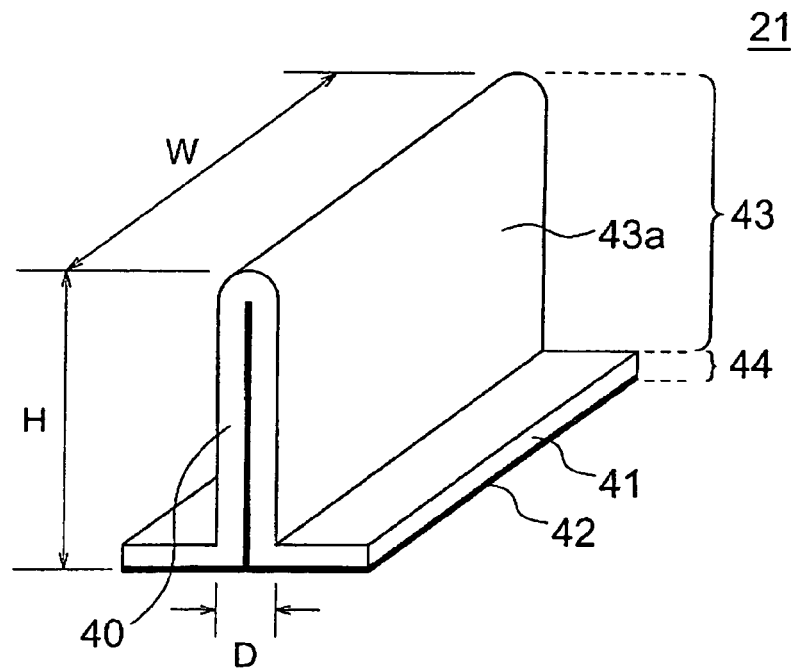
FIG. 4 is an enlarged perspective view depicting the reflecting member shown in FIG. 3A.

FIG. 4 shows the detailed structure of the reflecting member 21. The reflecting member 21 has an overall shape of "T" as viewed from the side edge thereof parallel to the reflecting surface 43a. The reflecting member 21 is manufactured by bending a stripe sheet having a white first surface and a second surface attached with an adhesive layer 42 so that the second surface is sandwiched between portions of the first surface, and bending at both the end portions of the stripe sheet. Thus, the resultant reflecting member 21 has a pair of two-faced mirror portion 43 for reflecting the light from the lamps 13 and a base portion 44 to be fixed onto the rear reflection plate 11. The mirror portion 43 has a pair of mirror surfaces 43a each having a light scattering property and a reflectance of 97% or higher. The bottom surfaces of the base portions 44 attached with an adhesive layer 42 is fixed onto the rear reflection plate 11. The reflecting member 21 is 19 mm wide, 4.9 mm high and 0.2 mm thick at the mirror portion 43, for example.

The stripe sheet may be formed from a transparent plastic material, such as PET (polyethylene terephthalate) plastics in which small-diameter beads having a light scattering property are dispersed.

Back to FIGS. 3A to 3C, the lamp 13 has a diameter of 3 mm, the pitch (L1) of the lamps 13 arranged is 24.0 mm, the distance (L2) between the lamp center and the reflecting member 21 is 3.4 mm, and the distance (L3) between the lamp center and the diffusion plate 18 is 8.8 mm, for example. The pitch (L4) of the reflecting members 21 arranged is 100 mm, and the distance (L5) between the lamp 13 and the reflecting member 21 is 1.0 mm, for example. The reflecting member 21 is disposed apart from the lamps 13, whereby the light emitted from the lamps 13 is scarcely shielded by the side surfaces (40 in FIG. 4) of the reflecting member 21.

Figure 5:
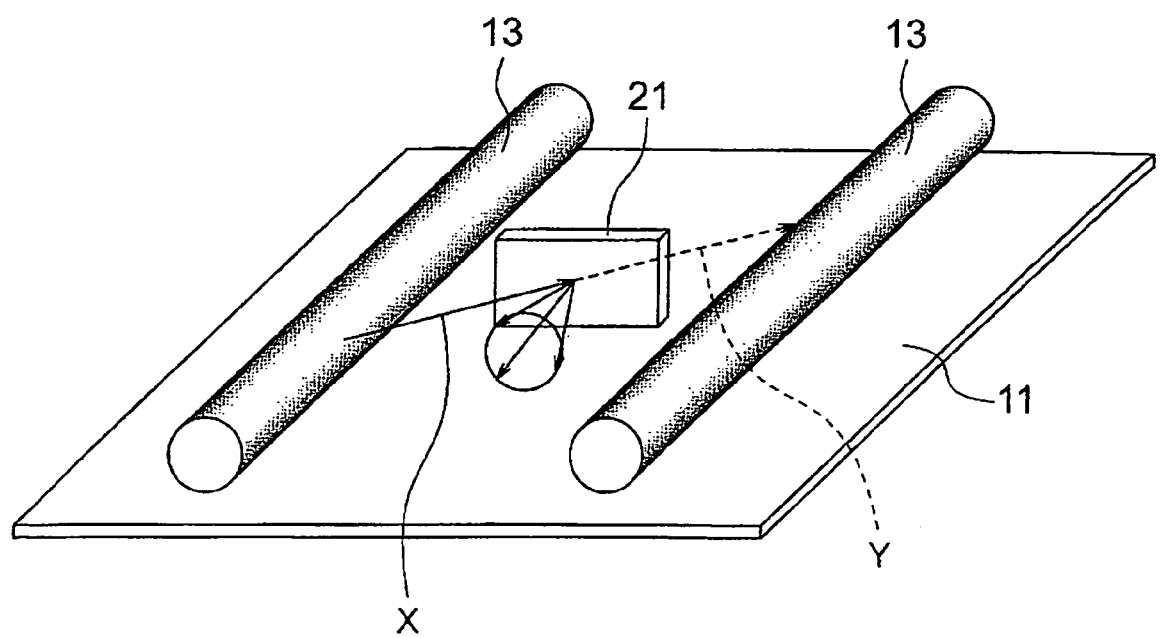
FIG. 5 is a perspective view of the vicinity of the reflecting member of FIG. 4.
Figure 6:
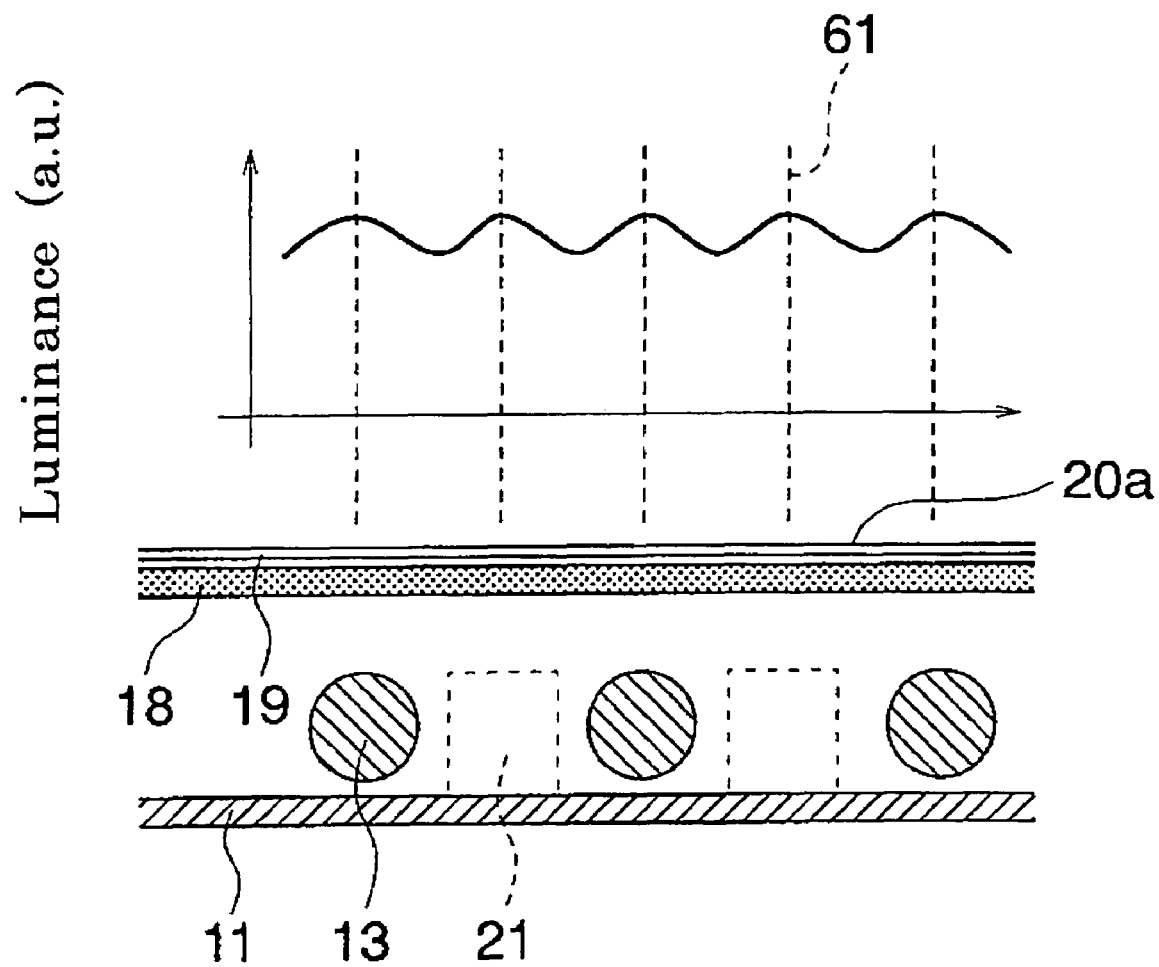
FIG. 6 is a graph depicting the luminance profile of the emission surface along line B-B in FIG. 3A, attached with the figure showing the arrangement of the lamps.

FIG. 5 shows the reflecting member 21 and the vicinity thereof. The light beam (X) emitted from a lamp 13 parallel to the rear reflection plate 11 is incident onto the mirror surface 43a of the reflecting member 21. In the conventional lighting apparatus, the corresponding light beam "X" is incident onto the adjacent lamps 13 as shown by the dotted line "Y", and scattered by the surface of the adjacent lamp 13 to thereby increase the luminance of the portion of the optical sheet 19 in front of the adjacent lamp 13. In the lighting apparatus 10 of the present embodiment, the light beam "X" incident onto the reflecting surface 43a of the reflecting member 21 is scattered to be incident onto the diffusion plate 18 directly or after being reflected by the rear reflection plate 11, thereby increasing the luminance of the portion of the emission surface 20a in front of the reflecting member 21. Thus, the luminance profile of the emission surface 20a of the lighting apparatus 10 is improved.

Figure 24:
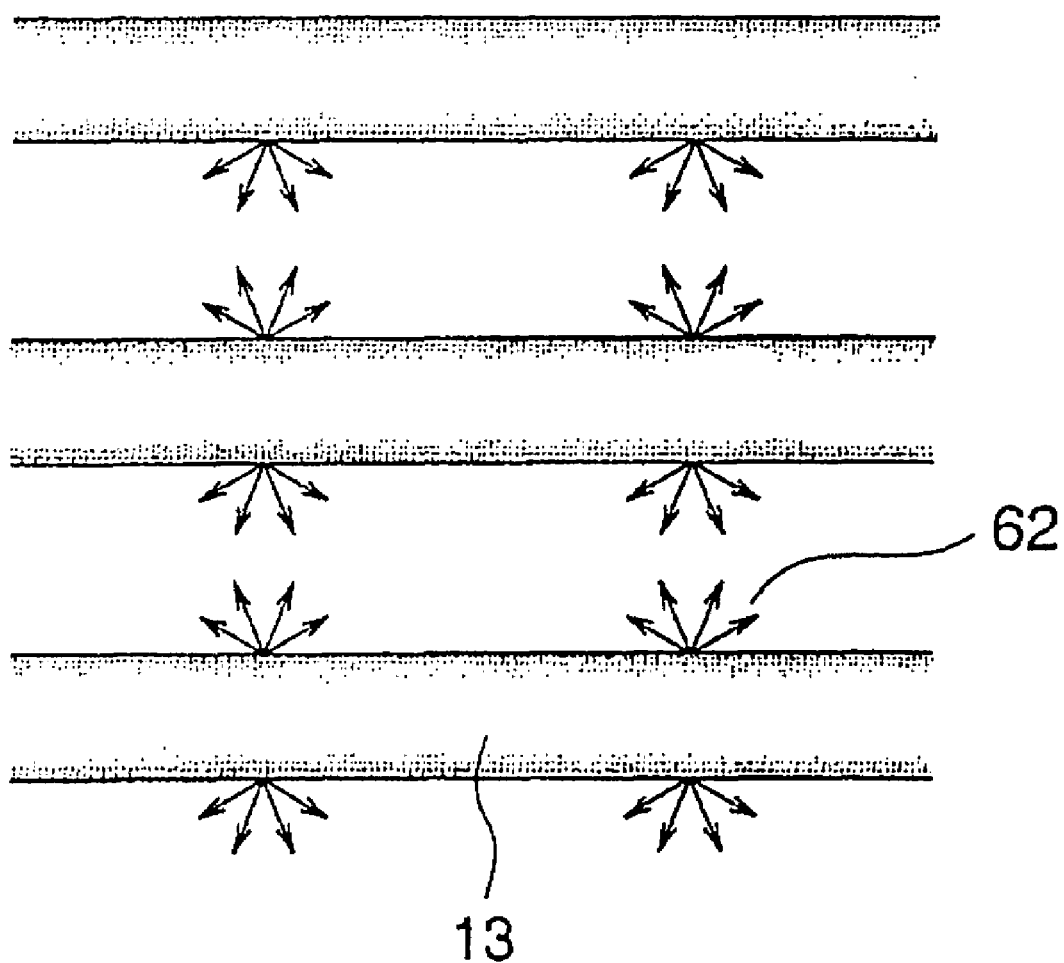
FIG. 24 is a top plan view of a portion of the conventional lighting apparatus showing the light emitted and diffused by the lamps.

FIG. 24 shows the light beams emitted by the lamp 13 and incident onto the adjacent lamp 13 in the conventional lighting apparatus. Comparing the light beams shown in FIG. 24 against the light beams shown in FIG. 3A, it will be understood that the lighting apparatus 10 of the present embodiment is superior to the conventional lighting apparatus 60 in the luminance profile of the emission surface 20a due to the presence of the reflecting members 21, which increase the luminance at the front of the gap between the lamps 13.

In design of the lighting apparatus 10 of the present embodiment, the design of the reflecting member 21 as to the dimensions or arrangement thereof can be performed after the design for the other components such as the rear reflection plate 11 is completed. The design of the reflecting member 21 can be also performed for the existing design of the lighting apparatus, or for the existing lighting apparatus. Thus, a lighting apparatus having a uniform luminance profile can be manufactured with ease and without involving a chromaticity difference on the emission surface.

Figure 7A:
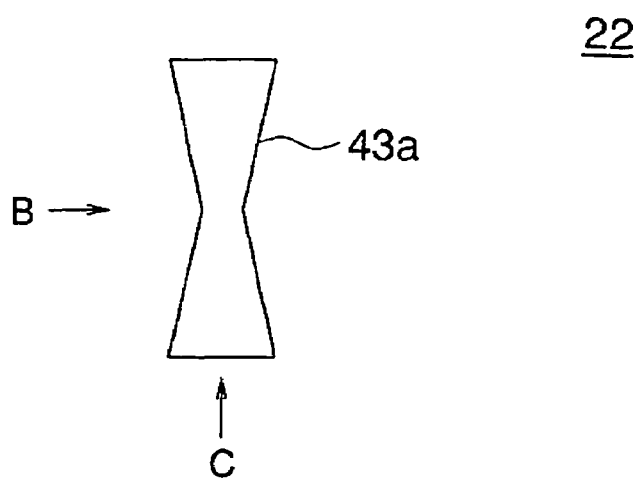
FIG. 7A is a top plan view of a reflecting member of a first modification modified from the first embodiment.
Figure 7B:
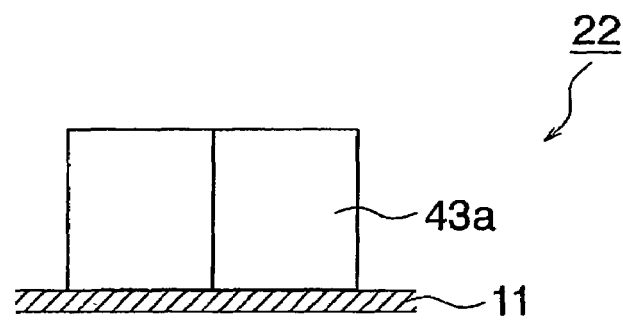
FIGS. 7B and 7C are side views as viewed along arrows B and C, respectively, in FIG. 7A.
Figure 7C:
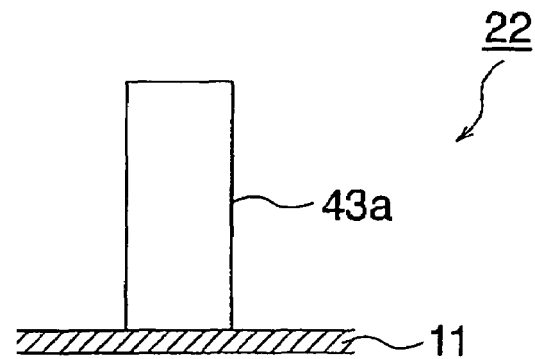

FIG. 7A shows a top plan view of another reflecting member 22 of a first modification modified from the reflecting member 21 of the above embodiment, and FIGS. 7B and 7C show sectional views as viewed from the directions "B" and "C" in FIG. 7A. The reflecting member 22 in this modification also has a pair of white reflecting surfaces 43a having a light scattering property and a reflectance of 97%. The mirror surface 43a has a depression in the central line as viewed in the direction normal to the extending direction of the elongate lamps 13. In the reflecting member 22, the thickness thereof linearly reduces along the direction from each side edge toward the central line. The material for the reflecting member 22 is similar to the material for the reflecting member 21 of the first embodiment.

In this modification, the light incident onto the mirror surfaces 43a of the reflecting member 22 is more effectively reflected from the mirror surface 43a to increase the luminance at the portion of the emission surface 20a corresponding to the gap between the lamps 13.

Figure 8A:
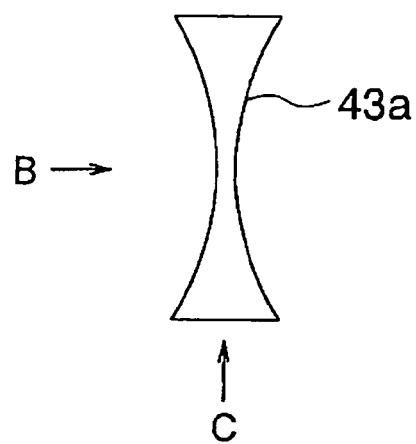
FIG. 8A is a top plan view of another reflecting member of a second modification modified from the second modification.
Figure 8B:
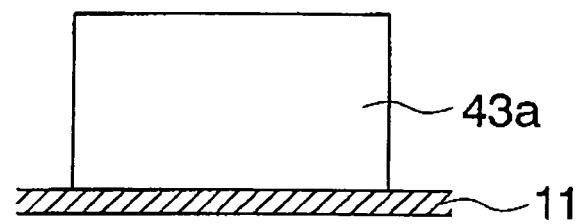
FIGS. 8B and 8C are side views as viewed along arrows B and C, respectively, in FIG. 7A.
Figure 8C:
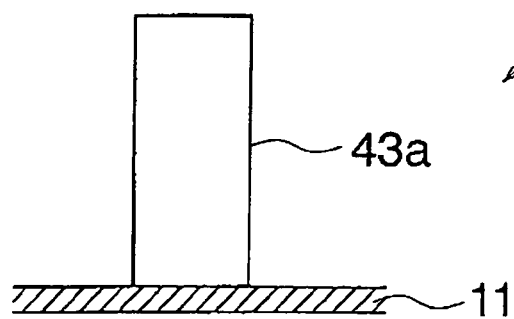

FIGS. 8A to 8C show similarly to FIGS. 7A to 7C, respectively, another reflecting member 23 of a second modification modified from the first modification. In the reflecting member 23 of the second modification, the thickness thereof reduces from the side edge to the central line along a quadratic curve, such as a circular arc. In other words, the mirror surface 43a is of a quadratic curve having a depression as observed from the top edge thereof, wherein the depression is most deep at the central line of the mirror surface 43a.

Figure 9A:
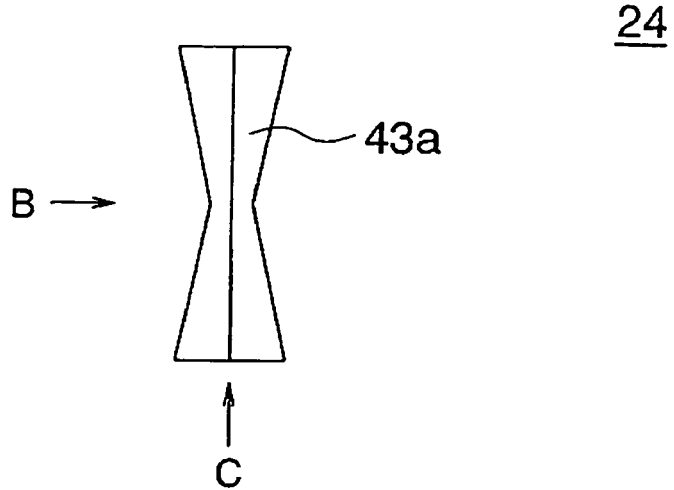
FIG. 9A is a top plan view of another reflecting member of a third modification modified from the second modification.
Figure 9B:
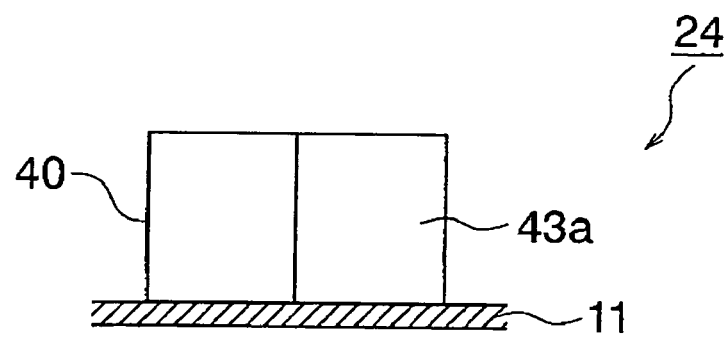
FIGS. 9B and 9C are side views as viewed along arrows B and C, respectively, in FIG. 9A.
Figure 9C:
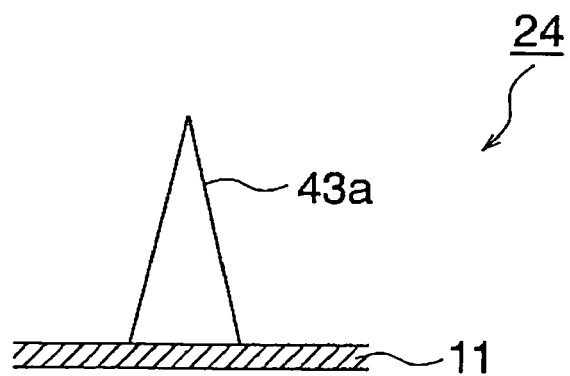

FIGS. 9A to 9C show similarly to FIGS. 7A to 7C, respectively, another reflecting member 24 of a third modification modified from the first modification. In the reflecting member 24 of the third modification, the thickness thereof linearly reduces from each side edge to the central line, and also linearly reduces from the base to the top edge thereof. The top edge of the reflecting member 24 is a sharp edge, and each side surface of the reflecting member 24 is of an isosceles triangle. This configuration more effectively reflects the light toward the portion of the emission surface corresponding to the gap between the lamps 13.

Figure 10A:
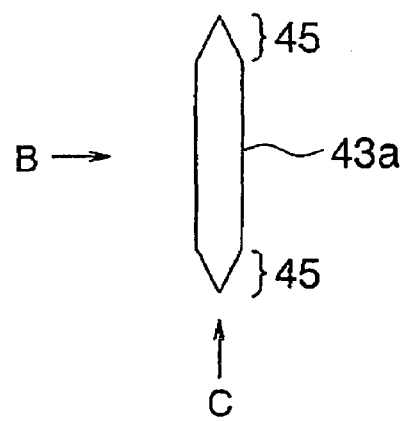
FIG. 10A is a top plan view of another reflecting member of a fourth modification modified from the first embodiment.
Figure 10B:
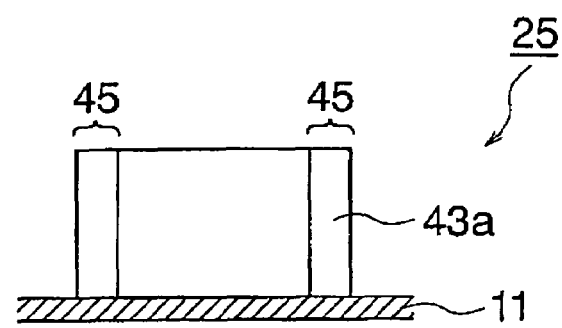
Figure 10C:
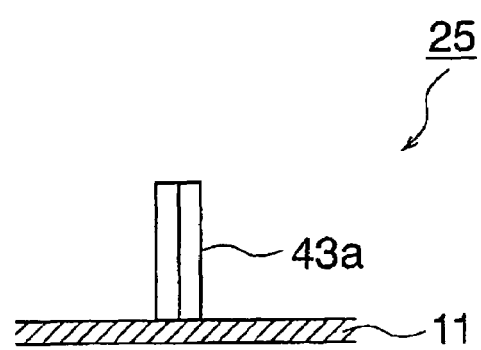

FIGS. 10A to 10C show similarly to FIGS. 7A to 7C, respectively, another reflecting member 25 of a fourth modification modified from the first embodiment. In the reflecting member 25 of the fourth modification, the thickness thereof is substantially constant in the central area, and linearly reduces in the vicinity of each side edge. That is, each side edge is a sharp edge. This configuration of the reflecting member 25 prevents the side surfaces of the reflecting member 25 from reflecting the light emitted from the adjacent lamps toward the same adjacent lamps 13.

Figure 11A:
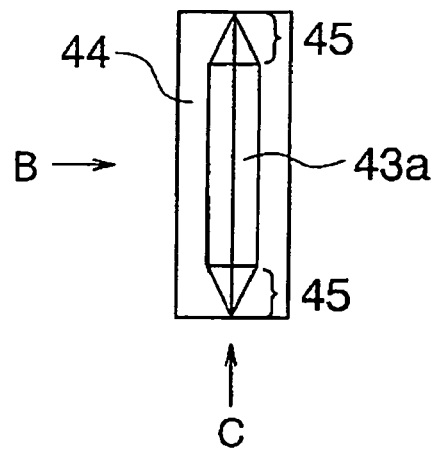
FIG. 11A is a top plan view of another reflecting member of a fifth modification modified from the fourth modification.
Figure 11B:
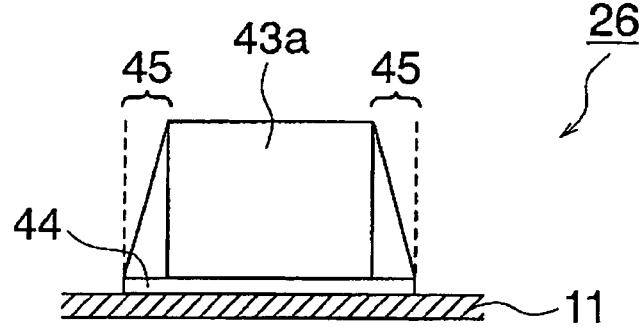
FIGS. 11B and 11C are side views as viewed along arrows B and C, respectively, in FIG. 11A.
Figure 11C:
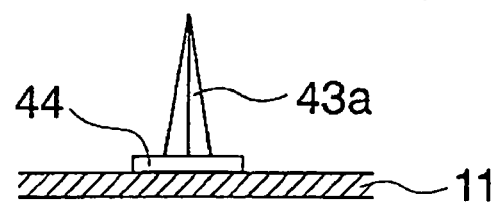

FIGS. 11A to 11C show similarly to FIGS. 7A to 7C, respectively, another reflecting member 26 of a fifth modification modified from the fourth modification. In the reflecting member 26 of the fifth modification, the thickness thereof is substantially constant in the central area and linearly reduces in the vicinity of each side edge. The side edge of the mirror surface 43a is slanted so that the width of the mirror surface 43a reduces from the base 44 to the top edge of the mirror surface 43a. This configuration of the reflecting member 25 allows the side edges 45 of the reflecting member 25 to more effectively reflect the light emitted from the adjacent lamps 13 toward the diffusion plate 18.

Figure 12A:
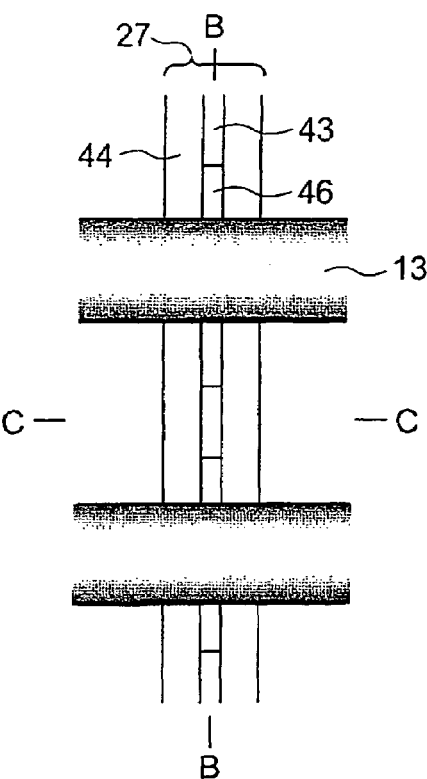
FIG. 12A is a top plan view of a portion of a lighting apparatus modified from the first embodiment.
Figure 12B:
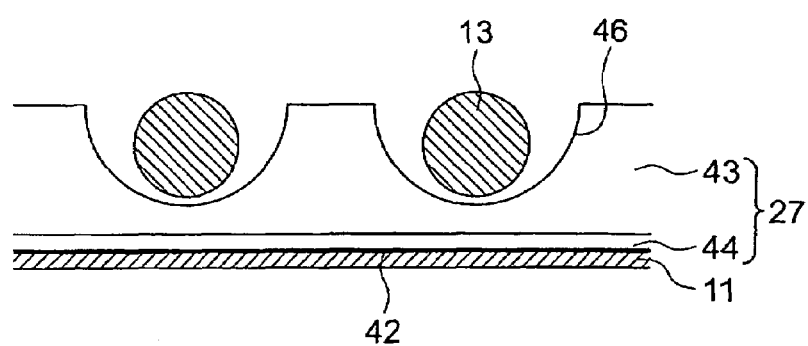
FIGS. 12B and 12C are side views as viewed along arrows B and C, respectively, in FIG. 12A.
Figure 12C:
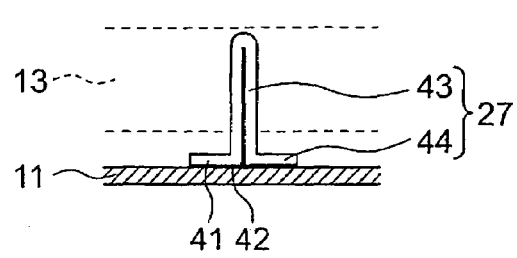

FIG. 12A shows a top plan view of a portion of a lighting apparatus of a sixth modification modified from the first embodiment. FIGS. 12B and 12C show the lighting apparatus of FIGS. 12A in the directions "B" and "C", respectively, in FIG. 12A. In the lighting apparatus of this modification, the reflecting member 27 has a sectional structure similar to the sectional structure of the reflecting member 21 shown in FIG. 3, extends normal to the extending direction of the lamps 13, and crosses the lamps 13 to support the same. The reflecting member 25 has a semi-circular cutout 46 for each of the lamps 13 to support the same within the cutout 46. In this configuration wherein the reflecting member 27 is formed as a single body in one row, the manpower for assembly of the reflecting members 27 onto the rear reflection plate 11 can be reduced.

Figure 13A:
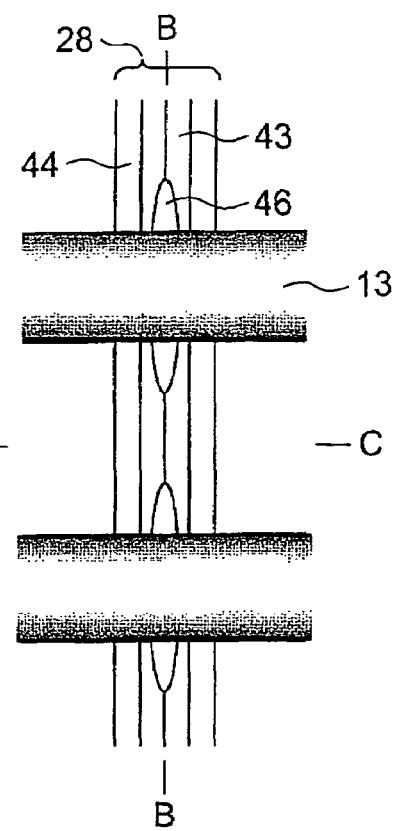
FIG. 13A is a top plan view of a portion of another lighting apparatus modified from the first embodiment.
Figure 13B:
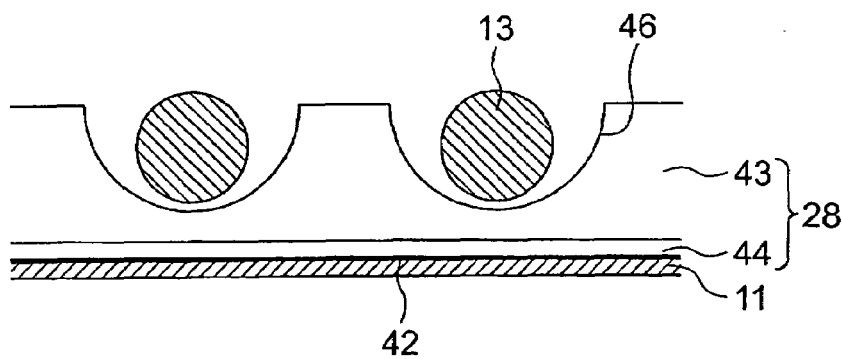
FIGS. 13B and 13C are side views as viewed along arrows B and C, respectively, in FIG. 13A.
Figure 13C:
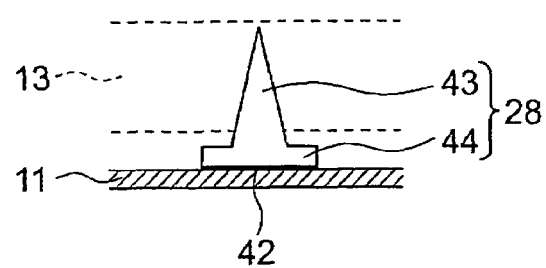

FIGS. 13A to 13C show, similarly to FIGS. 12A to 12C, respectively, a portion of another lighting apparatus of a seventh modification modified from the first embodiment. The reflecting member 28 of this modification is similar to the reflecting member 27 of the sixth modification except that the reflecting member 28 in this modification has a shape of isosceles triangle as viewed in the direction parallel to the mirror surfaces 43a.

Figure 14A:
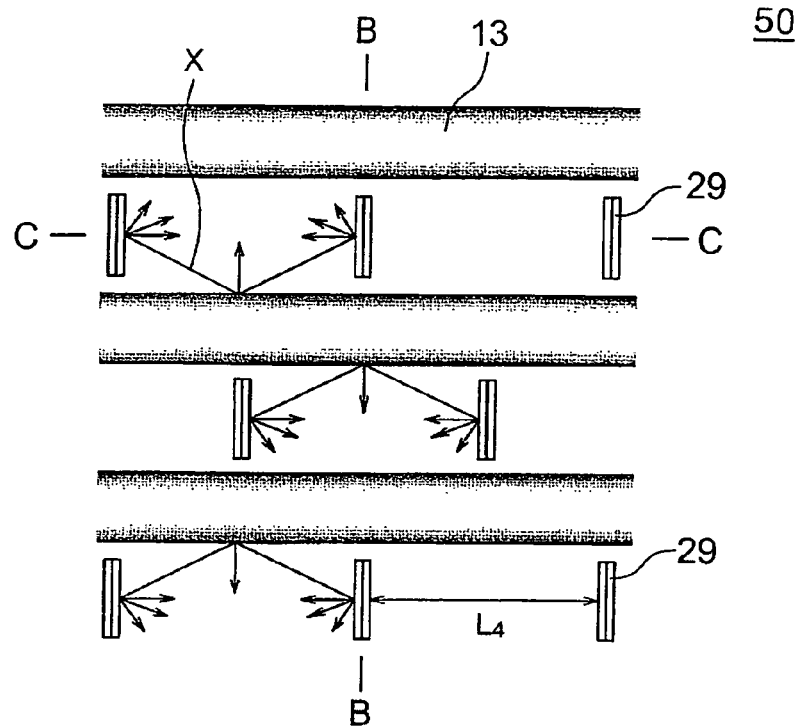
FIG. 14A is a top plan view of a portion of another lighting apparatus modified from the first embodiment.
Figure 14B:
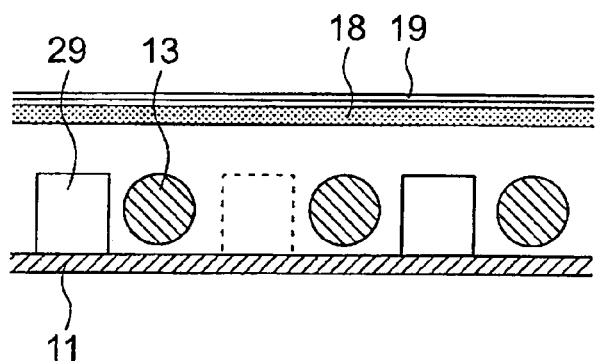
FIGS. 14B and 14C are side views as viewed along arrows B and C, respectively, in FIG. 14A.
Figure 14C:
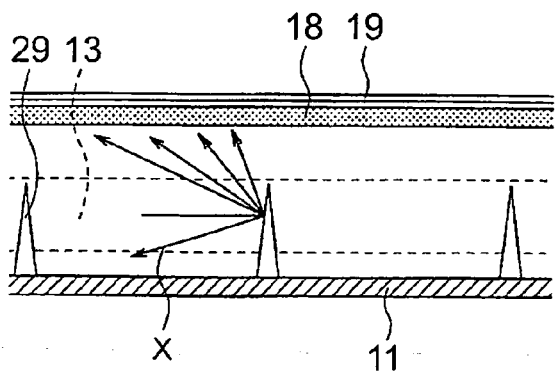

FIG. 14A shows, similarly to FIG. 3A, a portion of another lighting apparatus of an eighth modification modified from the first embodiment. FIGS. 14B and 14C show the lighting apparatus of this modification in the directions "B" and "C", respectively, in FIG. 14A. In this modification, the reflecting member 29 has a shape of isosceles triangle as viewed parallel to the mirror surfaces thereof. The reflecting members 29 are arranged in a zigzag fashion. In other words, adjacent two reflecting members 29 in the adjacent columns are deviated from each other in the columnar direction by half the columnar pitch of the arrangement of the reflecting members 29. In this configuration, the ununiformity of the luminance caused by the array arrangement of the reflecting members can be alleviated due to the deviation of the adjacent reflecting members 29.

The reflecting members in the first through fifth, seventh and eighth modifications may be made of a metallic film having a light scattering or diffusion surface, a plastic material having a light reflecting property, or a metallic or plastic plate coated with or attached with a reflecting sheet. Examples of the plastic material having a light reflecting property include ABS or PC plastics mixed with white dye or titanium oxide. The reflecting members may be mechanically attached to the rear reflection plate with or without using an adhesive.

Figure 15:
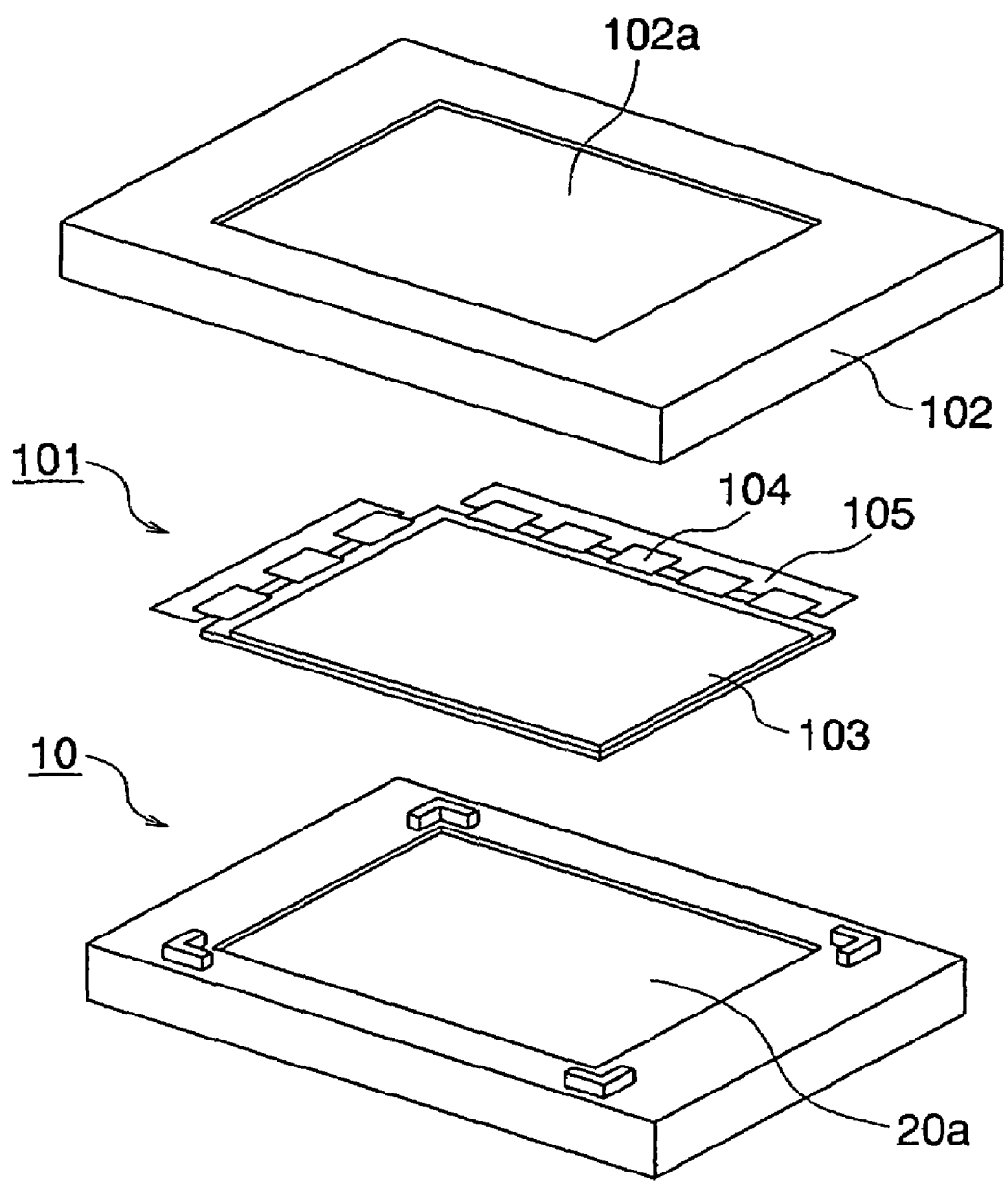
FIG. 15 is an exploded perspective view of a lighting apparatus according to a second embodiment of the present invention.

FIG. 15 shows an LCD device according to a second embodiment of the present invention, which includes the lighting apparatus 10 of the first embodiment as a backlight unit of the LCD device. The LCD device 100 includes the backlight unit 10, a panel unit 101 disposed in front of the backlight unit 10, and a front shield 102 for fixing the panel unit 101 onto the backlight unit 10 and defining the screen 102a of the panel unit 101. The panel unit 101 includes an LC (liquid crystal) panel 103, a plurality of TCPs (tape carrier packages) 104 mounting thereon driver ICs (not shown) and connected to the LC panel 103 for driving the LC panel 103, and a plurality of driving boards 105 connected to the TCPs 104 for feeding driving signals to the TCPs 104.

Due to the function of the backlight unit 10 of the present embodiment, the LCD device 100 achieves a uniform luminance profile on the screen 102a of the LC panel 103 and thus has a superior image quality.

Figure 16:
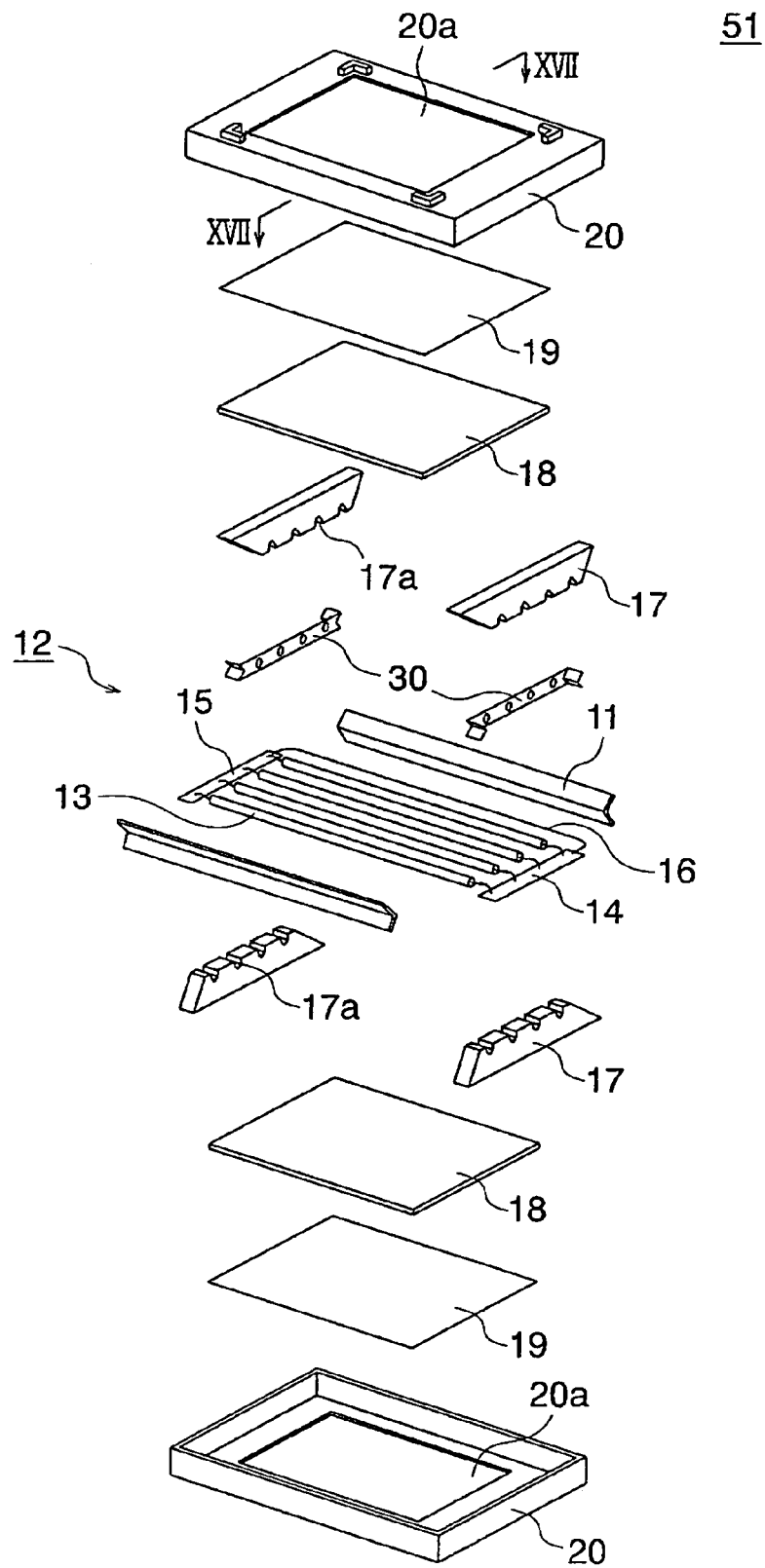
FIG. 16 is an exploded perspective view of a lighting apparatus according to a third embodiment of the present invention.
Figure 17:
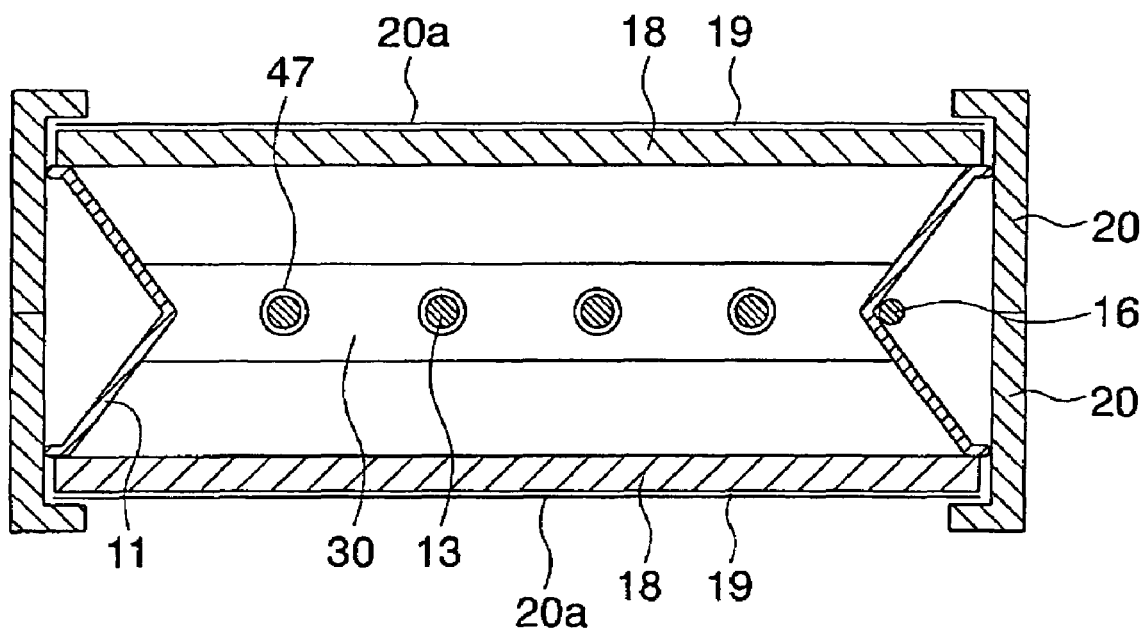
FIG. 17 is a sectional view of the lighting apparatus of the third embodiment taken along line XVII-XVII in FIG. 16.

FIG. 16 shows, in an exploded perspective view, a lighting apparatus according to a third embodiment of the present invention. FIG. 17 shows a sectional view of the lighting apparatus of FIG. 16 taken along line XV11-XV11 in FIG. 16. The lighting apparatus 51 of the present embodiment is a double-sided backlight unit of a direct emission type for use in an LCD device having a pair of LC panels. The double-sided backlight unit 51 includes a housing 20, a lamp assembly 12 including a plurality of elongate lamps 13 extending parallel to one another in the housing 20, and a pair of side reflection plates 11 disposed in the vicinities of both the edges of the housing 20 and extending parallel to the lamps 11. The lamp assembly 12 has a configuration similar to the lamp assembly in the first embodiment, wherein the return cable 16 extends outside the housing 20 in the vicinity of one of the side reflection plates to be connected to the return substrate 15.

The lighting apparatus 51 of the present embodiment includes a plurality of reflecting members 30 extending normal to the extending direction of the lamps 13. The reflecting members 30 are arranged at a uniform pitch in the extending direction of the lamps 13. The reflecting member 30 has a plurality of circular through-holes 47 each corresponding to and receiving therein one of the lamps 13.

The lamp assembly 12 includes a pair of lamp supports 17 in the vicinity of each of both the ends of the lamps 13. The lamp support 17 has a plurality of semi-circular cutouts 17a each corresponding to and receiving therein one of the lamps 13. The lamp housing is configured by a pair of chassises 20 fixing therebetween diffusion plates 18 and optical sheets 19 to define the space of the housing 20. The chassis has an opening exposing therethrough an emission surface 20a of the backlight unit 51.

Figure 18A:
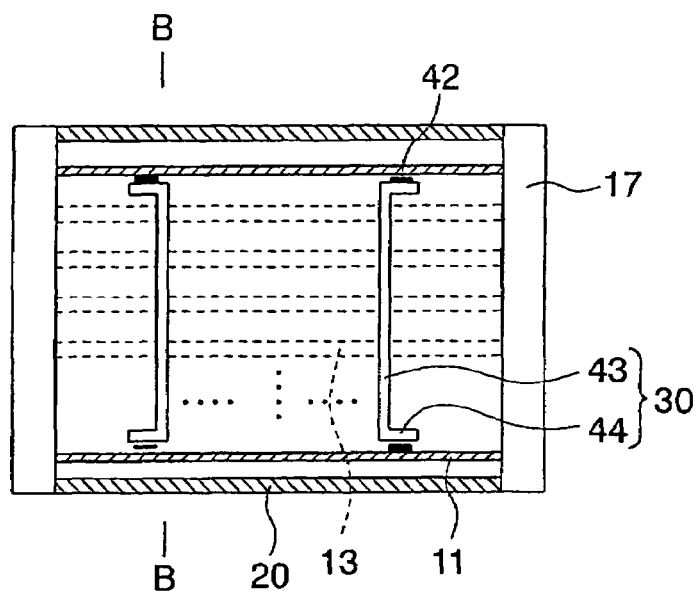
FIG. 18A is a sectional view of the lighting apparatus of FIG. 16 or 17 taken along a plane parallel to the diffusion plate therein.
Figure 18B:
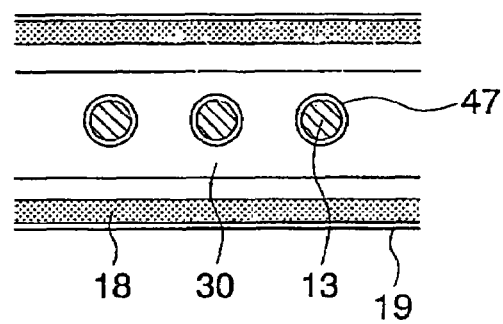
FIG. 18B is a sectional view taken along line B-B in FIG. 18A.

FIGS. 18A and 18B show the structure of the reflecting members 30. The reflecting member 30 has an overall shape of "[" and includes a stripe reflecting section 43 and a pair of legs 44 for fixing the reflecting member 30. The pair of legs 44 are fixed onto the side reflection plates 11 by means of adhesive layers 42. The side reflection plate 30 is made from white PET plastics and has a reflectance of 97%.

In the lighting apparatus of the present embodiment, the reflecting members 30 reflect the light emitted by the lamps 13 toward the diffusion plates 18 to thereby increase the luminance of both the emission surfaces 20a especially at the portions corresponding to the gap between the lamps 13. Thus, the ununiformity of the luminance can be alleviated by the reflecting members 30.

Figure 19:
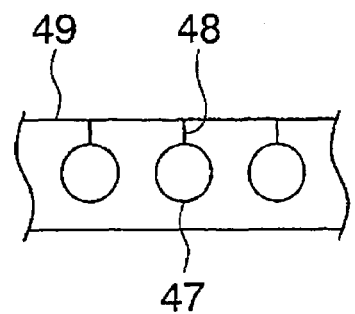
FIG. 19 is a sectional view of a portion of a lighting apparatus modified from the third embodiment taken along line corresponding the line B-B in FIG. 18A.

FIG. 19 shows a portion of another reflecting member 31 of a modification modified from the third embodiment. The reflecting member 31 includes a slit 48 corresponding to each of the through-holes 47 receiving therein the lamps. The lamp can be inserted to the through-hole 47 via the slit 48. This reduces the manpower for assembly of the lighting apparatus.

Figure 20:
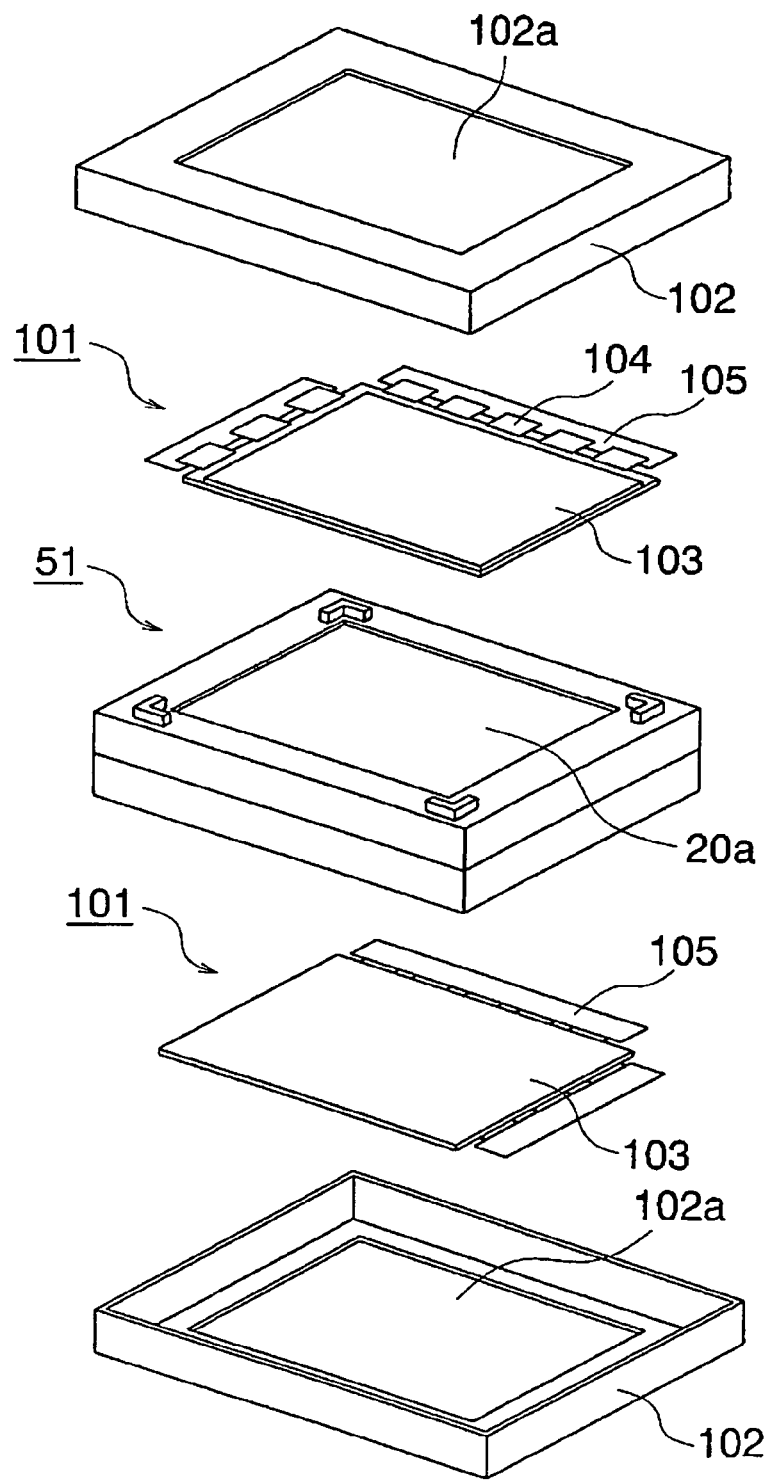
FIG. 20 is an exploded perspective view of an LCD device according to a fourth embodiment of the present invention.

FIG. 20 shows, in an exploded perspective view, an LCD device according to a fourth embodiment of the present invention, which includes the lighting apparatus 51 of the third embodiment. The LCD device 106 is configured as a double-sided LCD device, and includes the lighting apparatus 51 of the third embodiment, a pair of LC panels 101 each disposed on one of both the emission surfaces 20a of the lighting apparatus 51, and a pair of front shields 102 for defining the housing to receive therein the LC panel 101 and the backlight unit 51. The double-sided LCD device 106 has a pair of screens 102a, which achieve a uniform luminance.

The lighting apparatus of the present invention can be used as devices other than the backlight unit in the LCD device, such as a room illumination or other illuminations. The lighting apparatus of the present invention may include circular lamps disposed concentrically to one another. In such a case, the tangential direction of the circular lamp may be referred to as the extending direction of the circular lamp.

The lighting apparatus of the present invention may include a plurality of columns each including a plurality of lamps. In such a case, since the coupling portion of adjacent lamps in a column may have a lower luminance due to the discontinuity of the lamps in the column, the reflecting member should be disposed in the vicinity of the coupling portion to increase the luminance to achieve a uniform luminance.

It is to be noted that the term "a plurality of luminescent members" used in this text includes both the meanings: a plurality of lamps and a plurality of luminescent portions of a single lamp. It is also to be noted that the term "substantially normal" used in this text includes angles between 45 degrees and 90 degrees.

Since the above embodiments are described only for examples, the present invention is not limited to the above embodiments and various modifications or alterations can be easily made therefrom by those skilled in the art without departing from the scope of the present invention.

What is claimed is:

1. A lighting apparatus comprising a light diffusion plate, a plurality of elongate luminescent members extending parallel to one another in an operative relationship with said light diffusion plate, and a reflecting member formed by folding a stripe sheet having a first surface having a specific reflectance and a second surface having thereon an adhesive layer so that said second surface is sandwiched between portions of said first surface, said reflecting member having a pair of reflecting surfaces directed to opposite directions, at least a portion of said reflecting surfaces being disposed between adjacent luminescent members and extending in a direction crossing an extending direction of said luminescent members, wherein said at least one reflecting surface is substantially normal to said light diffusion plate.

2. The lighting apparatus according to claim 1, wherein said reflecting member has a thickness of 1 mm or less.

3. The lighting apparatus according to claim 1, further comprising a rear reflection plate disposed opposite to said light diffusion plate to sandwich therebetween said luminescent members and said reflecting member, wherein said reflecting member is fixed onto said rear reflection plate.

4. The lighting apparatus according to claim 1, wherein said at least one reflecting surface has a symmetry with respect to a plane passing through a central central line.

5. The lighting apparatus according to claim 4, wherein said at least one reflecting surface comprises two planar surfaces which cross each other at said central line.

6. The lighting apparatus according to claim 4, wherein said at least one reflecting surface is a curved surface.

7. The lighting apparatus according to claim 1, wherein said reflecting member has the shape of an isosceles triangle as viewed from side edges thereof.

8. The lighting apparatus according to claim 1, wherein said reflecting surfaces extend parallel to each other in a central portion thereof, and cross each other at an acute angle in vicinities of side edges of said reflecting member.

9. The lighting apparatus according to claim 8, wherein said reflecting member has a thickness larger at a base portion thereof than at a top portion thereof in said vicinities of said side edges.

10. The lighting apparatus according to claim 1, wherein said reflecting surface has a light scattering property.

11. The lighting apparatus according to claim 1, wherein a plurality of said reflecting members are disposed alternately with said luminescent members.

12. The lighting apparatus according to claim 11, wherein a plurality of said reflecting members are arranged in a columnar direction parallel to said extending direction of said luminescent members.

13. The lighting apparatus according to claim 12, wherein adjacent reflecting members in adjacent columns are deviated from each other in said columnar direction.

14. The lighting apparatus according to claim 1, wherein said reflecting member crosses said luminescent member in a direction normal to said extending direction of said luminescent members.

15. The lighting apparatus according to claim 1, wherein said reflecting surface has a reflectance of 97% or higher.

16. The lighting apparatus according to claim 1, wherein a single said light diffusion plate is disposed in front of said luminescent members and said reflecting member.

17. The lighting apparatus according to claim 1, wherein a pair of said light diffusion plates are disposed to sandwich therebetween said luminescent members and said reflecting member.

18. A liquid crystal display (LCD) device comprising a liquid crystal (LC) panel and the lighting apparatus according to claim 1 as a backlight unit for said LC panel.

19. A lighting apparatus comprising a light diffusion plate, a plurality of luminescent members extending parallel to one another in an operative relationship with said light diffusion plate, and a reflecting member having at least one reflecting surface, at least a portion of said reflecting surface being disposed between adjacent luminescent members and extending in a direction crossing an extending direction of said luminescent members, wherein said reflecting member is formed by folding a stripe sheet having a first surface having a specific reflectance and a second surface having thereon an adhesive layer so that said second surface is sandwiched between portions of said first surface.

20. A lighting apparatus comprising a light diffusion plate, a plurality of luminescent members extending parallel to one another in an operative relationship with said light diffusion plate, and a reflecting member having at least one reflecting surface, at least a portion of said reflecting surface being disposed between adjacent luminescent members and extending in a direction crossing an extending direction of said luminescent members, wherein said reflecting surface has a symmetry with respect to a plane passing through a central line of a gap between said adjacent lamps, and has a depression having a largest depth at said central line.

21. A lighting apparatus comprising a light diffusion plate, a plurality of luminescent members extending parallel to one another in an operative relationship with said light diffusion plate, and a plurality of reflecting members each having at least one reflecting surface, at least a portion of said reflecting surface being disposed between adjacent luminescent members and extending in a direction crossing an extending direction of said luminescent members, wherein said plurality of said reflecting members are disposed alternately with said luminescent members, the plurality of said reflecting member are arranged in a columnar direction parallel to said extending direction of said luminescent members, wherein adjacent reflecting members in adjacent columns are deviated from each other in said columnar direction.

22. A lighting apparatus comprising a light diffusion plate, a plurality of elongate luminescent members extending parallel to one another in an operative relationship with said light diffusion plate, and a reflecting member having a pair of reflecting surfaces directed to opposite directions, at least a portion of said reflecting surface being disposed between adjacent luminescent members and extending in a direction crossing an extending direction of said luminescent members, wherein said at least one reflecting surface is substantially normal to said light diffusion plate, and at least one reflecting surface has a symmetry with respect to a plane passing through a central line of a gap between said adjacent lamps, and has a depression n having a largest depth at said central line.

23. The lighting apparatus according to claim 22, wherein said at least one reflecting surface comprises two planar surfaces which cross each other at said central line.

24. The lighting apparatus according to claim 22, wherein said at least one reflecting surface is a curved surface.

25. A liquid crystal display (LCD) device comprising a liquid crystal (LC) panel and the lighting apparatus according to claim 22 as a backlight unit for said LC panel.

26. A lighting apparatus comprising a light diffusion plate, a plurality of elongate luminescent members extending parallel to one another in an operative relationship with said light diffusion plate, and a reflecting member having at least one reflecting surface, at least a portion of said reflecting surface being disposed between adjacent luminescent members and extending in a direction crossing an extending direction said luminescent members, wherein said at least one reflecting surface is substantially normal to said light diffusion plate, wherein said reflecting members are disposed alternatively with said luminescent members and are arranged in a columnar direction parallel to said extending direction of said luminescent members, and wherein adjacent reflecting members in adjacent columns are diviated from each other in said columnar direction.

* * * * *